United States Patent Office 3,567,799
Patented Mar. 2, 1971

3,567,799
METHOD OF PREPARING STABILIZED HIGH MO-
LECULAR WEIGHT POLYESTER RESIN BY CON-
DENSING LOW MOLECULAR WEIGHT POLY-
ESTER RESIN AND PHOSPHOROUS CONTAIN-
ING POLYESTER RESIN
Dusan C. Prevorsek, Princeton, N.J., assignor to The
Goodyear Tire & Rubber Company, Akron, Ohio
No Drawing. Continuation of application Ser. No.
373,045, June 5, 1964. This application Jan. 25,
1968, Ser. No. 700,650
Int. Cl. C08g 17/133, 39/10, 51/58
U.S. Cl. 260—860
14 Claims

ABSTRACT OF THE DISCLOSURE

The invention relates to process for stabilizing polyester resin by adding phosphorus modified polyester resin to a low molecular weight polyester resin and condensing to form high molecular weight polymer. Resins of improved stability are produced.

This application is a continuation of copending application Ser. No. 373,045, filed June 5, 1964 and now abandoned.

This invention relates to an improvement in condensation polyester resins and to a method for preparing condensation polyesters having improved stability.

Highly polymeric polyesters are derived from glycols and dicarboxylic acids or ester-forming derivatives thereof by condensation reaction. In carrying out such reactions the reactants are treated under strigent conditions of elevated temperature and reduced pressure for considerable periods of time. The polymeric polyesters prepared develop a light yellow or brown color which is highly undesirable because such color is carried over into products made from the polyester resins. Development of any yellow or brown color is especially undesirable in fibers and films, which constitute a major use for condensation polyester resins. In addition to the development of color, condensation polyesters degrade on exposure to heat and to conditions that favor hydrolysis of ester compounds.

It is an object of the present invention to produce polyester resins of improved stability. Another object is to produce polyester resins having a very low degree of color. Another object is to provide a method of producing polyester resins having a low degree of color and which have good thermal and hydrolytic stability. Other objects will appear as the description of the invention proceeds.

According to the invention, highly polymeric condensation polyester resins having superior stability and improved color are produced by incorporating in such resins a phosphorus containing low molecular weight polymeric polyester compounds.

The invention is illustrated in the following examples. Parts and percentage figures throughout the specification and claims are expressed on a weight basis unless otherwise stated.

EXAMPLE 1

Two hundred and twenty-two grams of a low molecular weight 60/40 ethylene terephthalate/ethylene isophthalate copolyester which had an intrinsic viscosity of about 0.3 and contained condensation catalyst and 227 grams of triphenyl phosphate were charged into a glass reaction vessel and reacted by heating the mixture under nitrogen atmosphere at 200–279° C. at five to seven millimeters of mercury pressure. After two hours of reaction under these conditions, materials had reacted and the polymer had an intrinsic viscosity of about 0.5. It was discharged from the reactor and ground into small particles.

EXAMPLE 2

A mixture of 113.85 pounds of dimethyl terephthalate, 12.65 pounds of dimethyl isophthalate (90/10 molar ratio) and 96.4 pounds of ethylene glycol were charged into a stainless steel reaction vessel. The mixture was heated to 140° C. to melt the diesters. Then a mixture of 0.036 percent zinc acetate dihydrate and 0.025 percent antimony trioxide catalysts (based on weight of diesters) was added. The temperature of the mixture was slowly raised to 215° over a period of three hours. At the end of this time the ester interchange reaction was completed. The product was transferred to another reaction vessel wherein the temperature was raised to 280° C. as the pressure was reduced to 1.5 millimeters of mercury pressure over a one hour period. The polymerization reaction was then continued at 280° C. for one hour and 30 minutes. At this point 0.54 pound of the phosphorus modified polyester of Example 1 was added and the polymerization reaction continued for about 20 minutes. The resulting stabilized polymer had an intrinsic viscosity of 0.652. It had good heat stability and was very light in color. The polymer was tested for heat stability by heating a sample of dry polymer for two hours at 280° C. at atmospheric pressure under dry nitrogen. The polyester stabilized in this manner showed a decrease in intrinsic viscosity of 0.077 under these conditions as compared with a decrease of 0.126 as observed for a control sample without heat stabilizer. The color of the stabilized resin was rated 5 on a laboratory color comparison scale and found to be one unit lower than the rating obtained for the non-stabilized polyester on a laboratory color scale.

The stabilizing agents of the invention can be incorporated in the resins to be stabilized by adding them to low molecular weight polyester, i.e., a polyester having an intrinsic viscosity of from about 0.1 to 0.2 measured in a 60/40 phenol-tetrachloroethane mixed solvent at 30.0° C. and polymerizing it or by adding them to polyester-forming reactants such as the lower alkyl esters of the acids and the glycol or the acids and the glycol and reacting them to form high molecular weight polymer or by adding them late in the polymerization process. Thus, the stabilizing agents can be added to the original reactants, to the finished polyester resin or to the reactants at some intermediate stage in the preparation of the resins. It is generally preferred to add the stabilizer to the bis glycol esters or to the low polymer just prior to start of the condensation polymerization reaction.

The invention has been illustrated particularly with respect to stabilizing an ethylene terephthalate/ethylene isophthalate copolyester resin. The stabilizers are also effective in stabilizing other condensation polyester resins. Representative examples of such condensation polyester resins which are stabilized according to the invention are resins derived from dicarboxylic acids or ester forming derivatives thereof and glycols, for example, polyethylene terephthalate, polytetramethylene terephthalate, polycyclohexanedimethanol terephthalate, polyethylene bibenzoate and copolyesters derived from a dicarboxylic acid and a mixture of glycols, such as ethylene terephthalate-neopentyl terephthalate copolyesters, ethylene terephthalate-cyclohexane dimethanol terephthalate copolyesters and copolyesters derived from a mixture of dicarboxylic acids and one or more glycols, such as copolyesters of terephthalic acid with another aromatic dicarboxylic acid, for example, ethylene terephthalate-ethylene isophthalate copolyesters, copolyesters of ethylene glycol and neopentyl glycol with terephthalic acid and isophthalic acid and copolyesters of an aromatic dicarboxylic acid, such as terephthalic acid with an aliphatic dicarboxylic acid, for example, ethylene terephthalate-ethylene sebacate copolyester and ethylene terephthalate-ethylene adipate copolyester. Dicarboxylic acids from which the resins can be derived are aliphatic dicarboxylic acids such as adipic acid, sebacic acid, azelaic acid and aliphatic diacids having more than 10 methylene linkages; aromatic dicarboxylic acids such as orthophthalic acid, isophthalic acid, terephthalic acid, 2,5-dichloroterephthalic acid, bibenzoic acid and the naphthalic acids. The resins can be made from various glycols, including ethylene glycol and other glycols such as the propylene glycols and alkyl substituted propylene glycols, such as neopentyl glycol and 2-methyl-2-ethyl-1,3-propane diol and the butylene glycols, pentamethylene glycol, hexamethylene glycol, decamethylene glycol, diethylene glycol, 1,4-cyclohexane dimethanol and cyclic glycols such as 2,2,4,4-tetramethyl-1,3-cyclobutanediol. Ethylene glycol is a preferred glycol because of its low cost and ready availability.

The invention has been illustrated particularly with respect to the use of a 60/40 ethylene terephthalate-ethylene isophthalate copolyester modified with triphenyl-phosphate as the stabilizer. Other phosphorus-modified resins can be used. Representative examples of such resins are modified polyethylene terephthalate, terephthalate copolyesters such as ethylene terephthalate-neopentyl terephthalate copolyesters, ethylene terephthalate-cyclohexane dimethanol terephthalate copolyesters, ethylene terephthalate-ethylene sebacate copolyesters, tetramethylene terephthalate-tetramethylene isophthalate copolyesters, copolyesters of mixtures of acids and mixtures of glycols such as ethylene glycol-neopentyl glycol-terephthalate, isophthalate copolyesters, ethylene glycol-neopentyl glycol terephthalate-sebacate copolyesters and other such polyester resins.

Various phosphorus compounds which can be used to modify the low molecular weight polymeric polyester to prepare stabilizers include phosphates, phosphites and other esters of phosphorus acids. Mixtures of such compounds can be used.

Representative examples of some phosphorus compounds that can be used are triphenyl phosphite, triphenyl phosphate, tricresyl phosphate, triethyl phosphite, methyl diphenyl phosphite and triphenylthiophosphate.

Representative examples of low molecular weight polymeric polyester compounds which can be modified for use as stabilizers according to the invention are low molecular weight condensation polyesters, such as polyethylene terephthalate, the polyethylene terephthalate/isophthalates, the polyethylene/alkyl substituted propylene terephthalates, polyethylene terephthalate/sebacates, physical blends of two linear polyester homopolymers or copolymers, and block type copolyesters. The low molecular weight polymeric polyester compounds have an intrinsic viscosity range of about 0.30 to about 0.5.

In the preparation of the polyester resins various catalysts can be used. Suitable catalysts for the ester interchange reaction used to prepare the polyester resins are zinc acetate, manganese acetate, calcium acetate, and the alkali metal alcoholates. Catalysts suitable for the condensation reactions by which the high molecular weight polymers are prepared are soluble antimony compounds such as antimony trioxide, lead compounds such as lead acetate and litharge and titanium compounds such as titanium alcoholates and polymeric ethylene glycol titanate.

The phosphorus modified polyester resins of the invention used are stabilizers containing from about 5 percent to about 25 percent by weight of phosphorus, the preferred modified resin containing from 10 to 15 percent by weight of phosphorus. They are prepared from low molecular weight linear condensation polyesters having an intrinsic viscosity in the range of from about 0.2 to about 0.5. The modified resins used as stabilizers have an intrinsic viscosity in the range of 0.35 to 0.6 as measured in a 60/40 phenol-tetrachloroethane mixed solvent at 30° C.

The amount of the phosphorus modified polyester stabilizer used can be varied over a wide range of concentrations. Generally the amount used will be from 0.005 to 0.2 percent, calculated as percent phosphorus, by weight of the polyester resin used. The preferred amounts usable will be in the range of from 0.01 to 0.10 percent, calculated as phosphorus, by weight of the polyester resin to obtain optimum stability in the resin. It is generally preferred to use a phosphorus modified resin as stabilizer that contains glycol units and acid units of the same variety contained in the resin being stabilized. However, the stabilizer can contain different units if desired.

The reactions by which the resins are prepared are in general carried out in accordance with the usual known techniques. Thus the reactions are preferably carried out in the absence of oxygen, generally in an atmosphere of inert gas such as nitrogen or the like, in order to lessen darkening and to make it possible to prepare a high molecular weight lightly colored or colorless product. The condensation reaction is carried out under reduced pressure, generally below 10 millimeters of mercury pressure, and usually at or below one millimeter of mercury pressure at a temperature in the range of from about 260 to 290° C. to form high molecular weight polyester having an intrinsic viscosity of at least 0.4 measured in a 60/40 phenol-tetrachloroethane mixed solvent at 30.0° C.

It is well known in the art to add phosphite and phosphate compounds to stabilize polyesters. However, when such stabilizers are added to the reactants at high temperatures some of the stabilizer is distilled out before it can react, particularly when the stabilizer is added to the reaction mixture at very low pressures. Not only do corrections need to be made to compensate in loss of these stabilizers, but the recovered glycol is contaminated by these stabilizers as well as from phenol, cresol, and other materials liberated when the stabilizer reacts with the polyester. Another disadvantage of using the above stabilizers is that they generally cause an increase in polymerization reaction time to be required for the polymer to attain the desired degree of polymerization.

When phosphorus modified polyesters of this invention are used to improve color, thermal and hydrolytic stability of polyesters, no loss of stabilizer results. The reaction cycle times are not materially affected, and essentially no contamination of recovered glycol results. Another advantage of using the phosphorus modified polyesters of this invention is that the loss in intrinsic viscosity or decrease in molecular weight that occurs on incorporation of the conventional phosphorus stabilizers in polyester resin is essentially eliminated.

While certain representative embodiments and details have been shown for the purpose of illustrating the invention it will be apparent to those skilled in this art that various changes and modifications may be made therein without departing from the spirit or scope of the invention.

What is claimed is:

1. A process which comprises incorporating in a low molecular weight polyester resin consisting of the reaction product of glycols and dicarboxylic acids or ester forming derivatives thereof, said resin having an intrinsic viscosity of about 0.2, a second condensation polyester resin consisting of the reaction product of glycols and dicarboxylic acids or ester forming derivatives thereof containing phosphorus in its molecular chain in the amount of from 0.005 to 0.2 percent by weight calculated as phosphorus based on the first said low molecular weight polyester and condensing the low molecular weight polyester resin to form highly polymeric polyester resin having an intrinsic viscosity of at least 0.4.

2. The process of claim 1 in which the said condensation polyester resin containing phosphorus in its molecular chain was prepared by the reaction of a low molecular weight polyester resin consisting of the reaction product of glycols and dicarboxylic acids or ester forming derivatives thereof, said resin having an intrinsic viscosity of about 0.1 to 0.2 and an ester of a phosphorus acid capable of reacting with a polyester resin.

3. The process of claim 1 in which the condensation polyester resin is a resin containing phosphorus in its molecular chain selected from the class consisting of polymeric ethylene terephthalate, ethylene terephthalate-ethylene isophthalate copolyesters, ethylene terephthalate-neopentyl terephthalate copolyesters, ethylene terephthalate-cyclohexane dimethanol terephthalate copolyesters, ethylene terephthalate-ethylene sebacate copolyesters, tetramethylene terephthalate-tetramethylene isophthalate copolyesters, ethylene glycol-neopentyl glycol terephthalate-isophthalate copolyesters, ethylene glycol-neopentyl glycol terephthalate-sebacate copolyesters modified with a phosphorus ester selected from the class consisting of phosphates, phosphites and thiophosphates.

4. The process of claim 3 in which the polyester resin is modified with triphenyl phosphate.

5. The process of claim 3 in which the polyester resin is modified with triphenyl phosphite.

6. The process of claim 3 in which the polyester resin is modified with triphenyl thiophosphate.

7. A process which comprises incorporating in low molecular weight polyester resin consisting of the reaction product of glycols and dicarboxylic acids or ester forming derivatives thereof, said polyester resin having an intrinsic viscosity of from about 0.1 to 0.2, a polyester resin consisting of the reaction product of glycols and dicarboxylic acids or ester forming derivatives thereof containing phosphorus in its molecular chain equivalent to 0.005 to 0.2 percent phosphorus by weight based on the low molecular weight polyester resin and condensing the low molecular weight polyester resin to form high molecular weight polyester resin having an intrinsic viscosity of at least 0.4.

8. The process of claim 1 in which the highly polymeric condensation polyester resin is polymeric ethylene terephthalate.

9. The process of claim 1 in which the highly polymeric condensation polyester is an ethylene terephthalate-ethylene isophthalate copolyester.

10. The process of claim 1 in which the highly polymeric condensation polyester is polymeric cyclohexane dimethanol terephthalate.

11. The composition comprising polymeric ethylene terephthalate and a stabilizing amount of a condensation polyester resin consisting of the reaction product of glycols, dicarboxylic acids or ester forming derivatives thereof and a phosphorus ester, said polyester containing phosphorus in its molecular chain in the amount of from 0.005 to 0.2% by weight calculated as phosphorus based on the polymeric ethylene terephthalate.

12. The composition comprising ethylene terephthalate-ethylene isophthalate copolyester resin and a stabilizing amount of a condensation polyester consisting of the reaction product of glycols and dicarboxylic acids or ester forming derivatives thereof, said polyester containing phosphorus in its molecular chain in the amount of from 0.005 to 0.2 percent by weight calculated as phosphorus based on the ethylene terephthalate-ethylene isophthalate copolyester resin.

13. The composition comprising polymeric cyclohexane dimethanol terephthalate and a stabilizing amount of a condensation polyester consisting of the reaction product of glycols and dicarboxylic acids or ester forming derivatives thereof, said polyester containing phosphorus in its molecular chain in the amount of from 0.005 to 0.2% by weight calculated as phosphorus based on the polymeric cyclohexane dimethanol terephthalate.

14. The composition comprising a highly polymeric condensation polyester resin consisting of the reaction product of glycols and dicarboxylic acids or ester forming derivatives thereof and a stabilizing amount of a polymeric linear condensation polyester containing phosphorus in its molecular chain in the amount of from 0.005 to 0.2% by weight calculated as phosphorus based on the highly polymeric condensation polyester resin said second polyester consisting of the reaction product of the same glycols and dicarboxylic acids or ester forming derivatives thereof used to prepare the highly polymeric linear condensation polyester.

References Cited

UNITED STATES PATENTS

| | | | |
|---|---|---|---|
| 2,437,046 | 3/1948 | Rothrock | 260—75 |
| 2,623,031 | 12/1952 | Snyder | 260—860 |

FOREIGN PATENTS

| | | | |
|---|---|---|---|
| 1,347,438 | 11/1963 | France | 260—860 |
| 862,539 | 3/1961 | Great Britain | 260—75 |
| 963,966 | 7/1964 | Great Britain | 260—75 |

OTHER REFERENCES

Review of Current Lit., vol. 39, 1966, Tarasov, 12273, "Unsaturated Phosphorus-Containing Polyesters."

WILLIAM H. SHORT, Primary Examiner

E. WOODBERRY, Assistant Examiner

U.S. Cl. X.R.

260—75, 45.7